Titus Powers,
Impd Method of Making Lock-Keys.
117110
PATENTED JUL 18 1871
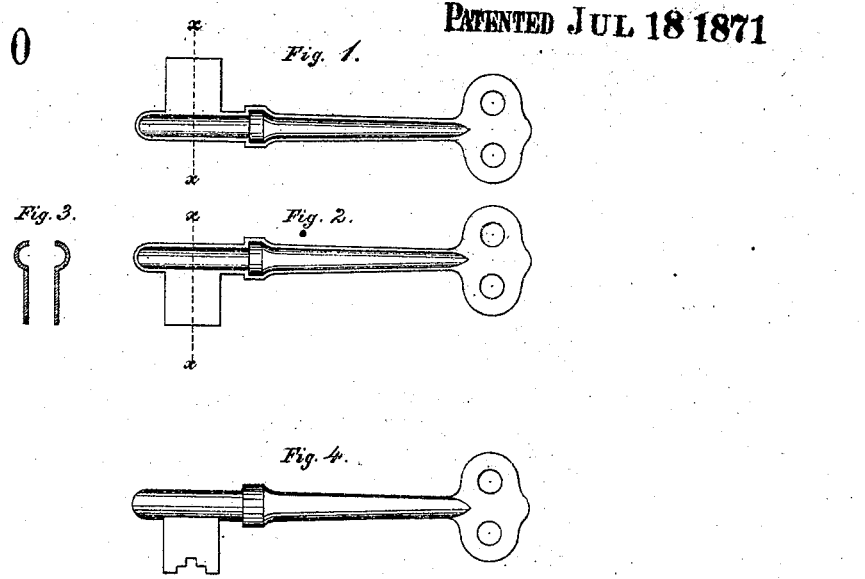
Witnesses:
Inventor
Titus Powers.

UNITED STATES PATENT OFFICE.

TITUS POWERS, OF NEW YORK, N. Y.

IMPROVEMENT IN SHEET-METAL KEYS FOR LOCKS.

Specification forming part of Letters Patent No. 117,110, dated July 18, 1871.

*To all whom it may concern:*

Be it known that I, TITUS POWERS, of the city, county, and State of New York, have invented a new and Improved Lock-Key, of which the following is a specification, reference being had to the accompanying drawing forming part of the same.

Figures 1 and 2 are halves of my key, intending to show a method by which the same may be made. Fig. 3 is an edge view of a section of the said halves cut through on the dotted line $x$ $x$; Fig. 4, a completed key as made with a round shank from the halves, Figs. 1 and 2.

My invention relates to a hollow lock-key as a new article of manufacture fabricated from sheet metal, the outline of its internal cavity being made to conform in shape to its external contour, thereby securing equal strength as in a solid key, while a saving both in metal and cost of fabrication is effected.

The following is a method by which my key may be made: Cut from a sheet of metal of proper thickness two pieces corresponding to each other in shape and to that of the outline of the key it is desired to make. Then, by suitable dies, stamp, in a drop-press or otherwise, the two pieces into the form represented by Figs. 1, 2, and 3, the shank and stem portion of each forming one-half of a hollow shaft or tube. Then place these halves together and unite them by soldering or brazing. When thus completed they form the key, Fig. 4.

By this method a key may be made at a small cost, and a considerable saving of material is effected without loss of strength, while the key, being made lighter than if solid, is more conveniently and pleasantly carried.

The method of forming tubes for various purposes in halves and then uniting the halves by soldering or brazing being in use, I do not claim such method, of itself, of making tubes. I am also aware that the stems of keys have been made hollow by drilling a straight hole or cavity through them, as will be found described in the English patents of R. Larkin of 1854, and Hamilton & Nash of 1859. I do not, therefore, claim, broadly, a key having a hollow stem; but What I do claim, and desire to secure by Letters Patent, is—

A hollow lock-key fabricated from sheet metal, when the outline of the internal cavity conforms in shape to the external contour of the key, as set forth.

TITUS POWERS.

Witnesses:
JOHN J. CARROLL,
JAMES HAGAN.